(12) United States Patent
 Serencsits

(10) Patent No.: US 10,960,637 B2
(45) Date of Patent: Mar. 30, 2021

(54) CORE STRUCTURES FOR COMPOSITE PANELS, AIRCRAFT INCLUDING THE SAME, AND RELATED METHODS

(71) Applicant: The Boeing Company, Chicago, IL (US)

(72) Inventor: William L. Serencsits, Charleston, SC (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 16/025,243

(22) Filed: Jul. 2, 2018

(65) Prior Publication Data

US 2020/0001565 A1    Jan. 2, 2020

(51) Int. Cl.
| | | |
|---|---|---|
| *B32B 3/12* | (2006.01) | |
| *B32B 7/12* | (2006.01) | |
| *B32B 37/12* | (2006.01) | |
| *B32B 37/24* | (2006.01) | |
| *B64C 1/00* | (2006.01) | |

(Continued)

(52) U.S. Cl.
 CPC .................. *B32B 3/12* (2013.01); *B32B 7/12* (2013.01); *B32B 37/12* (2013.01); *B32B 37/24* (2013.01); *B64C 1/00* (2013.01); *B32B 2605/18* (2013.01); *B64C 1/12* (2013.01); *B64C 3/26* (2013.01);

(Continued)

(58) Field of Classification Search
 CPC .. B32B 3/12; B32B 7/12; B32B 3/263; B32B 5/145; B32B 3/02; B32B 3/26; B32B 2307/732; B32B 2607/00; B64C 1/00; B64C 1/12; B64C 3/26; B64C 2001/0072
 See application file for complete search history.

(56) References Cited

U.S. PATENT DOCUMENTS

2016/0046095 A1\*   2/2016   Clough ..................... B32B 7/12
                                                                181/286
2016/0097162 A1\*   4/2016   Levit ..................... D21H 19/12
                                                                428/116

(Continued)

FOREIGN PATENT DOCUMENTS

EP            0136096          4/1985

OTHER PUBLICATIONS

European Patent Office, Partial European Search Report for related European Patent Application No. 19172561, dated Nov. 29, 2019.

*Primary Examiner* — Brian M O'Hara
*Assistant Examiner* — Keith L Dixon
(74) *Attorney, Agent, or Firm* — Dascenzo Gates Intellectual Property Law, P.C.

(57) ABSTRACT

Core structures for composite panels, aircraft including the same, and related methods. A core structure includes a core body defining a first body side, a second body side, and a plurality of core cells. Each core cell includes at least one cell wall and defines a tubular cell void. Each core cell includes a bulk region and a transition region. Each cell wall is flared within the transition region to increase a surface area of the first body side relative to an average transverse cross-sectional area of the core body. A composite panel includes a core structure with at least one laminate ply coupled to the first body side of a core body. A method of manufacturing a composite panel includes forming a core body via an additive manufacturing process and operatively attaching at least one laminate ply to the core body.

20 Claims, 5 Drawing Sheets

(51) Int. Cl.
 *B64C 1/12* (2006.01)
 *B64C 3/26* (2006.01)
 *B64C 5/02* (2006.01)

(52) U.S. Cl.
 CPC ........ *B64C 5/02* (2013.01); *B64C 2001/0072* (2013.01)

(56) References Cited

U.S. PATENT DOCUMENTS

2016/0297509 A1   10/2016  Estadieu et al.
2018/0169993 A1*  6/2018   Carstensen .......... B29D 24/005
2018/0229443 A1*  8/2018   Pham .................... B21D 47/00

* cited by examiner

CORE STRUCTURES FOR COMPOSITE PANELS, AIRCRAFT INCLUDING THE SAME, AND RELATED METHODS

FIELD

The present disclosure relates to core structures for composite panels, aircraft including the same, and related methods.

BACKGROUND

Composite sandwich panels, which typically consist of a honeycomb structure positioned between two composite laminate sheets, are frequently utilized in applications where high strength and stiffness and low weight are desired. However, such structures generally include a small surface area for adhesion between the honeycomb core and the laminate, resulting in a weak bond between the honeycomb core and the laminate sheets. Thus, there exists a need for improved core structures for composite panels and for methods of manufacturing composite panels including the improved core structures.

SUMMARY

Core structures for composite panels, aircraft including the same, and related methods are disclosed herein. A core structure for a composite panel includes a core body defining a first body side, an opposed second body side, and a plurality of core cells extending between the first body side and the second body side. Each core cell includes at least one cell wall extending parallel to a cell axis and between a first end of the core cell and a second end of the core cell. The first end is defined on the first body side and the second end is defined on the second body side. Each core cell defines a tubular cell void that extends parallel to the cell axis at least partially between the first end of the core cell and the second end of the core cell. Each core cell includes a bulk region and a transition region.

In some examples, each cell wall has a bulk cell wall thickness, as measured in a direction perpendicular to the cell axis, within the bulk region, and a transition cell wall thickness, as measured in the direction perpendicular to the cell axis, within the transition region. In such examples, the transition cell wall thickness varies across the transition region between the bulk cell wall thickness in the bulk region and a first end wall thickness at the first end of the core cell, such that the first end wall thickness is larger than the bulk cell wall thickness.

In some examples, the tubular cell void of each core cell has a transverse cross-sectional area, as measured in a plane perpendicular to the cell axis, with an average bulk area value within the bulk region of the core cell and an average end area value within the transition region of the core cell, such that the average end area value is smaller than the average bulk area value.

In some examples, each cell wall is flared within the transition region such that the transverse cross-sectional area of the tubular cell void is smaller than an average transverse cross-sectional area averaged across a full height of the tubular cell void.

A composite panel includes a core structure and at least one laminate ply coupled to the first body side of a core body. A method of manufacturing a composite panel includes forming a core body via an additive manufacturing process and operatively attaching at least one laminate ply to the core body.

DESCRIPTION

Figure 1:
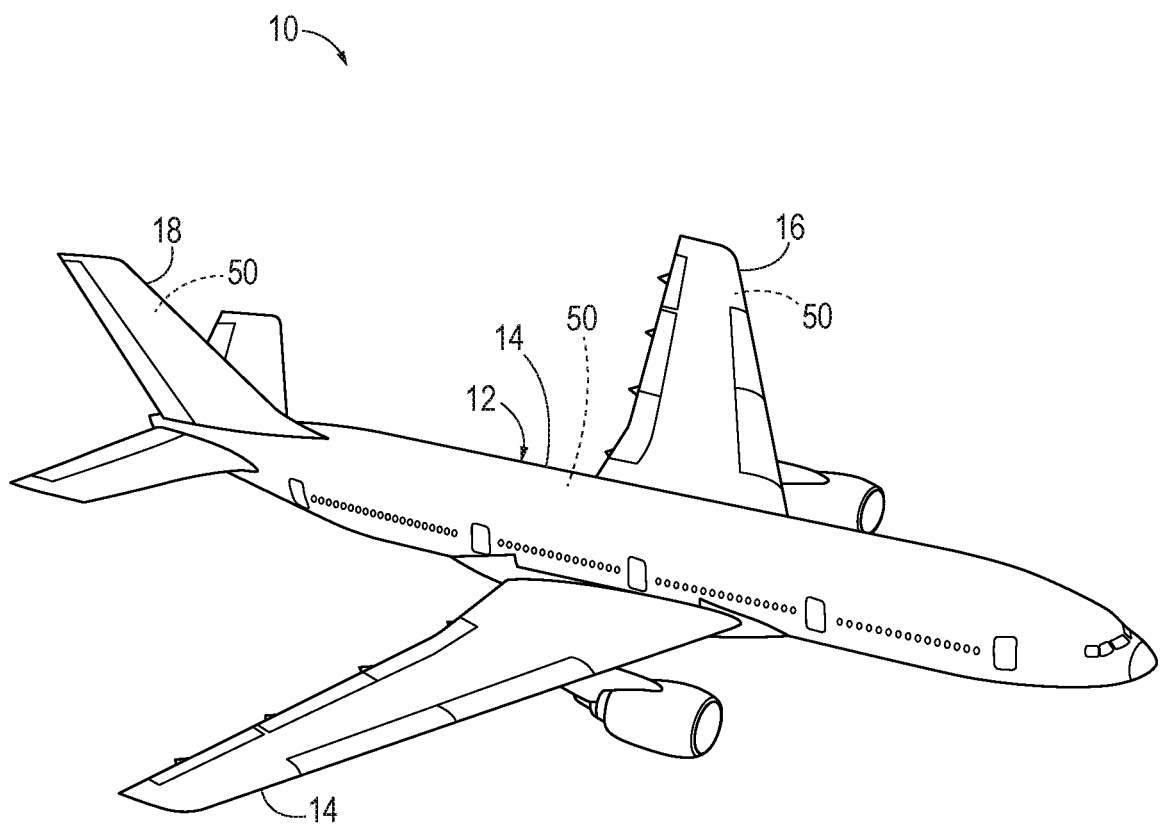
FIG. 1 is an illustration of an aircraft that may include and/or utilize core structures and/or composite panels, according to the present disclosure.

The examples described herein provide a core structure that includes a greater surface area for bonding a laminate sheet to the core structure, as compared to at least some known composite sandwich panels that include honeycomb core structures. More specifically, the examples described herein include filleted transition regions at one or both sides of the core structure. The filleted transition regions define interface surfaces to which the laminate sheet can be adhered or bonded. The interface surfaces can maintain the laminate sheet in a substantively planar configuration by supporting a greater proportion of the area of the laminate sheet, as compared to the relatively thin end surface of at least some known honeycomb core structures. In other words, the filleted transition regions can reduce the diameters of the core cells of the core structures as measured at the ends of the core cells, as compared to at least some known honeycomb core structures. The filleted transition regions can have textured and/or roughened interface surfaces, which can increase shear strength through mechanical locking between the textured surface and the laminate sheet.

FIGS. 1-6 provide illustrative, non-exclusive examples of core structures 100, of composite panels 50 including core structure 100, of aircraft 10 including composite panels 50 and/or core structure 100, and/or of methods 300 of manufacturing a composite panel, such as the composite panel 50, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is an illustration of an aircraft 10 that may include and/or utilize composite panels 50 and/or core structures 100 according to the present disclosure. Aircraft 10 may include an airframe 12. The airframe 12 may include a skin 14, at least one wing 16, and/or a tail portion 18. Aircraft 10 may include composite panel 50 in any appropriate manner. As examples, airframe 12 may include composite panel 50, and/or skin 14 may be at least partially defined by composite panel 50. Additionally or alternatively, wing 16 and/or tail portion 18 may include composite panel 50. Examples of aircraft 10 include an airplane, a commercial aircraft, a military aircraft, and/or a spacecraft.

Figure 2:
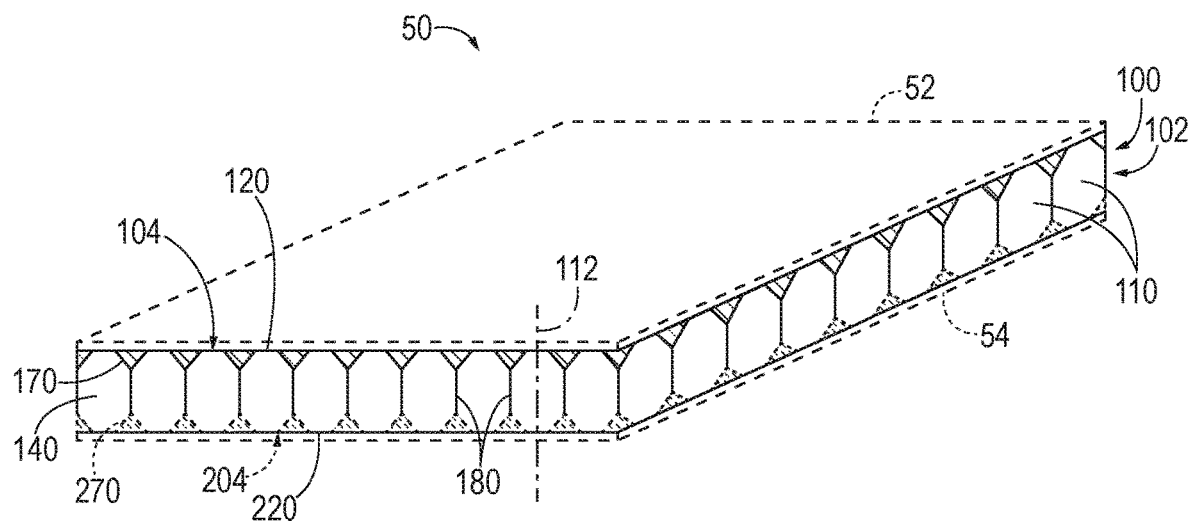
FIG. 2 is a schematic top isometric view illustrating examples of composite panels according to the present disclosure.
Figure 3:
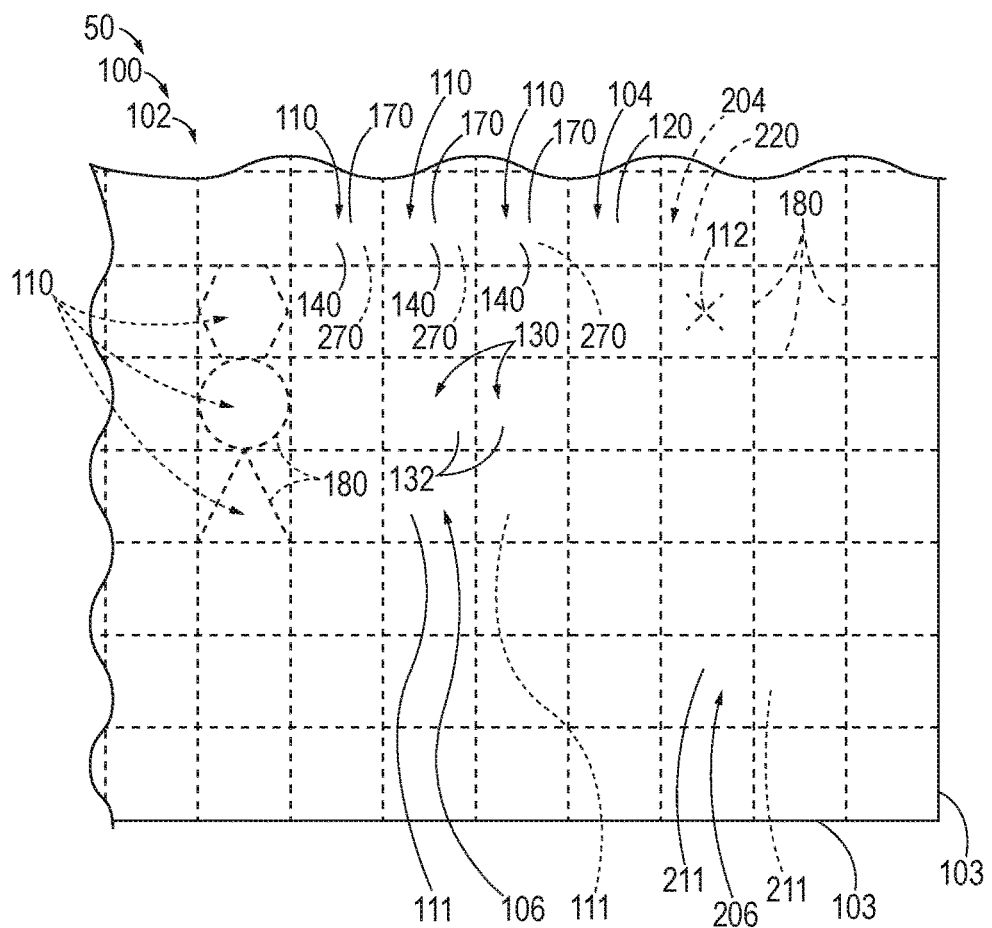
FIG. 3 is a schematic top plan view illustrating examples of core structures according to the present disclosure.

FIG. 2 is a schematic top isometric view illustrating examples of composite panels 50 according to the present disclosure, and FIG. 3 is a schematic top plan view illustrating examples of core structures 100. As schematically illustrated in FIGS. 2-3, a core structure 100 for a composite panel 50 includes a core body 102 defining a first body side 104, an opposed second body side 204, and a plurality of core cells 110 extending between first body side 104 and second body side 204. As schematically illustrated in FIG. 3, core body 102 may include and/or define at least one body edge 103 such that core body 102 extends between each body edge 103. Stated differently, core body 102 may be bounded by each body edge 103.

As additionally schematically illustrated in FIG. 2, composite panel 50 may include at least one laminate ply 52 coupled to first body side 104 of core body 102 and/or at least one laminate ply 54 coupled to second body side 204 of core body 102. In an embodiment in which composite panel 50 includes at least one laminate ply 52 coupled to first body side 104 of core body 102 and at least one laminate ply 54 coupled to second body side 204 of core body 102, composite panel 50 also may be referred to as a sandwich composite panel. Composite panel 50 may include any appropriate number of laminate plies 52 and/or laminate plies 54. As examples, the at least one laminate ply 52 may include 1 laminate ply, 2 laminate plies, 3 laminate plies, 4 laminate plies, at least 5 laminate plies, at least 10 laminate plies, at least 20 laminate plies, at least 30 laminate plies, at least 40 laminate plies, at most 50 laminate plies, at most 35 laminate plies, at most 25 laminate plies, at most 15 laminate plies, and/or at most 7 laminate plies coupled to first body side 104. Additionally or alternatively, the at least one laminate ply 54 may include 1 laminate ply, 2 laminate plies, 3 laminate plies, 4 laminate plies, at least 5 laminate plies, at least 10 laminate plies, at least 20 laminate plies, at least 30 laminate plies, at least 40 laminate plies, at most 50 laminate plies, at most 35 laminate plies, at most 25 laminate plies, at most 15 laminate plies, and/or at most 7 laminate plies coupled to second body side 204.

First body side 104 and/or second body side 204 may have any appropriate structure and/or configuration, such as to facilitate operatively coupling laminate ply 52 and/or laminate ply 54 to core body 102. As examples, first body side 104 and/or second body side 204 may be at least substantially smooth, at least substantially arcuate, at least substantially planar, at least partially curved, and/or complexly curved.

First body side 104 and/or second body side 204 may have a roughened surface, such as to increase a surface area of first body side 104 and/or of second body side 204. Such a feature may facilitate bonding between core body 102 and laminate ply 52 and/or between core body 102 and laminate ply 54. As examples, first body side 104 and/or second body side 204 may have a surface roughness, defined as an arithmetical mean deviation of a profile of first body side 104 and/or of second body side 204, that is at least 1 micrometer ($\mu m$), at least 5 $\mu m$, at least 10 $\mu m$, at least 50 $\mu m$, at least 100 $\mu m$, at least 200 $\mu m$, at least 500 $\mu m$, at least 1 mm, at most 2 mm, at most 700 $\mu m$, at most 300 $\mu m$, at most 70 $\mu m$, at most 30 $\mu m$, at most 7 $\mu m$, and/or at most 3 $\mu m$. Such a roughened surface may result from a manufacturing method utilized to produce core body 102. Stated differently, core body 102 may be formed via a manufacturing method that produces such a surface roughness, and/or that is configured to produce such a surface roughness. As a more specific example, and as discussed herein, core body 102 may be formed via an additive manufacturing process that produces a roughened and/or patterned surface on first body side 104 and/or on second body side 204 of core body 102.

As schematically illustrated in FIGS. 2-3, each core cell 110 includes at least one cell wall 180 extending parallel to a cell axis 112 and between a first end 120 and a second end 220 of core cell 110. First end 120 is defined on first body side 104 and second end 220 is defined on second body side 204. As schematically illustrated in FIG. 3, and as less schematically illustrated in FIGS. 4-5, each core cell 110 defines a tubular cell void 130 that extends parallel to cell axis 112 at least partially between first end 120 and second end 220.

Each core cell 110 may be described as having a bulk region 140 and a transition region 170 that extends between bulk region 140 and first end 120. Transition region 170 may include, define, and/or extend from first end 120 of core cell 110. Transition region 170 generally is configured to facilitate coupling at least one laminate ply 52 to core body 102. For example, and as described in more detail herein, transition region 170 may be configured to increase a surface area of first body side 104 of core body 102 to which laminate ply 52 may be operatively coupled. Stated differently, cell wall 180 may be flared (e.g., filleted) within transition region 170 to increase a surface area of first body side 104 of core body 102 relative to an average transverse cross-sectional area of core body 102. In this manner, core body 102 may facilitate a more robust bond to laminate ply 52 such that composite panel 50 has a greater shear strength relative to an otherwise identical composite panel formed with a core body that lacks transition region 170.

Each core cell 110 may include any appropriate number of cell walls 180 such that each core cell 110 forms a closed geometric shape. As examples, each core cell 110 may include once cell wall 180, more than one cell wall 180, three cell walls 180, four cell walls 180, five cell walls 180, six cell walls 180, and/or more than six cell walls 180. FIG. 3 schematically illustrates examples of core cells 110 with one cell wall 180, three cell walls 180, four cell walls 180, and six cell walls 180. In an embodiment in which each core cell 110 includes six cell walls 180, core structure 100 additionally or alternatively may be referred to as a honeycomb core structure 100. Each core cell 110 of core structure 100 may include the same number of cell walls 180. However, this is not required to all examples of core structure 100, and it is additionally within the scope of the present disclosure that core structure 100 may include core cells 110 with different numbers of cell walls 180.

In some examples of core body 102, each core cell 110 includes a plurality of transition regions 170. For example, and as schematically illustrated in FIGS. 2-3, transition region 170 may be a first transition region 170, and each core cell 110 additionally may include a second transition region 270 that extends between bulk region 140 and second end 220. Second transition region 270 may include, define, and/or extend from second end 220 of core cell 110. In such an embodiment, bulk region 140 may be described as separating first transition region 170 and second transition region 270. When present, second transition region 270 generally is configured to facilitate coupling at least one laminate ply 54 to second body side 204 of core body 102. For example, and as described in more detail herein, second transition region 270 may be configured to increase a surface area of second body side 204 of core body 102 to which laminate ply 54 may be operatively coupled.

Figure 4:
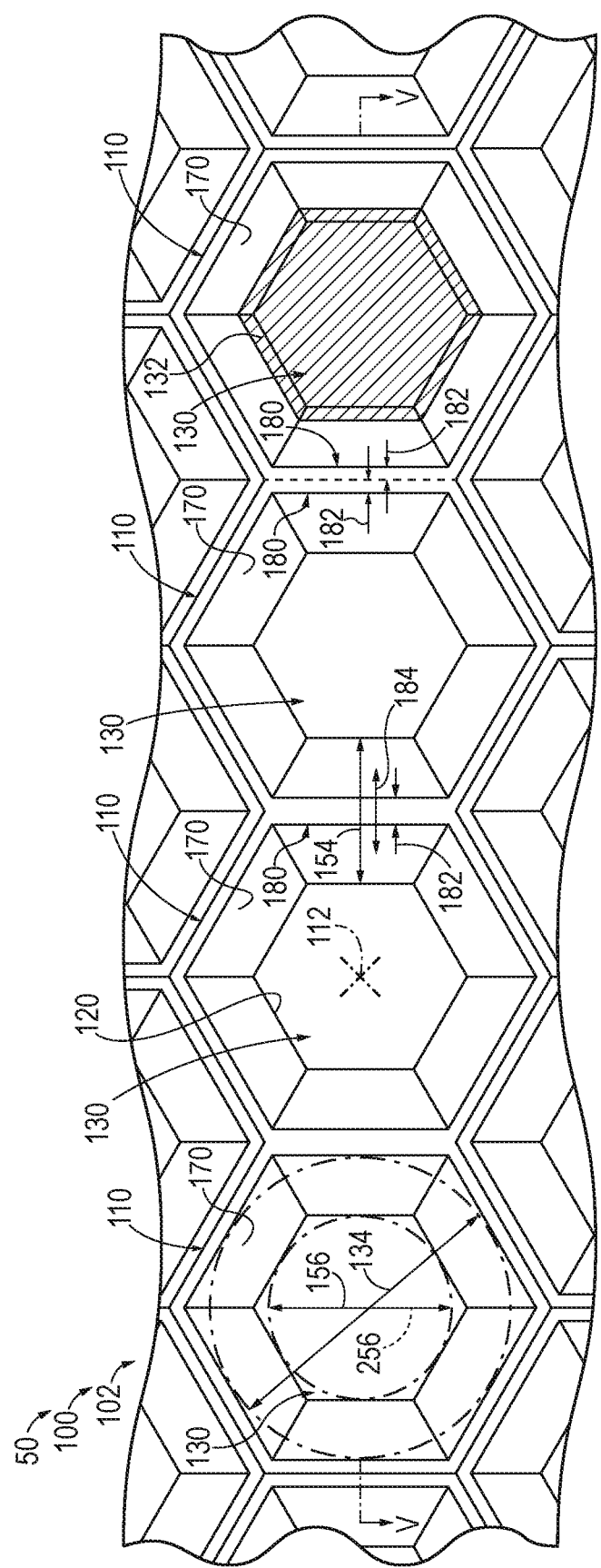
FIG. 4 is a less schematic fragmentary bottom plan view illustrating examples of core structures according to the present disclosure.
Figure 5:
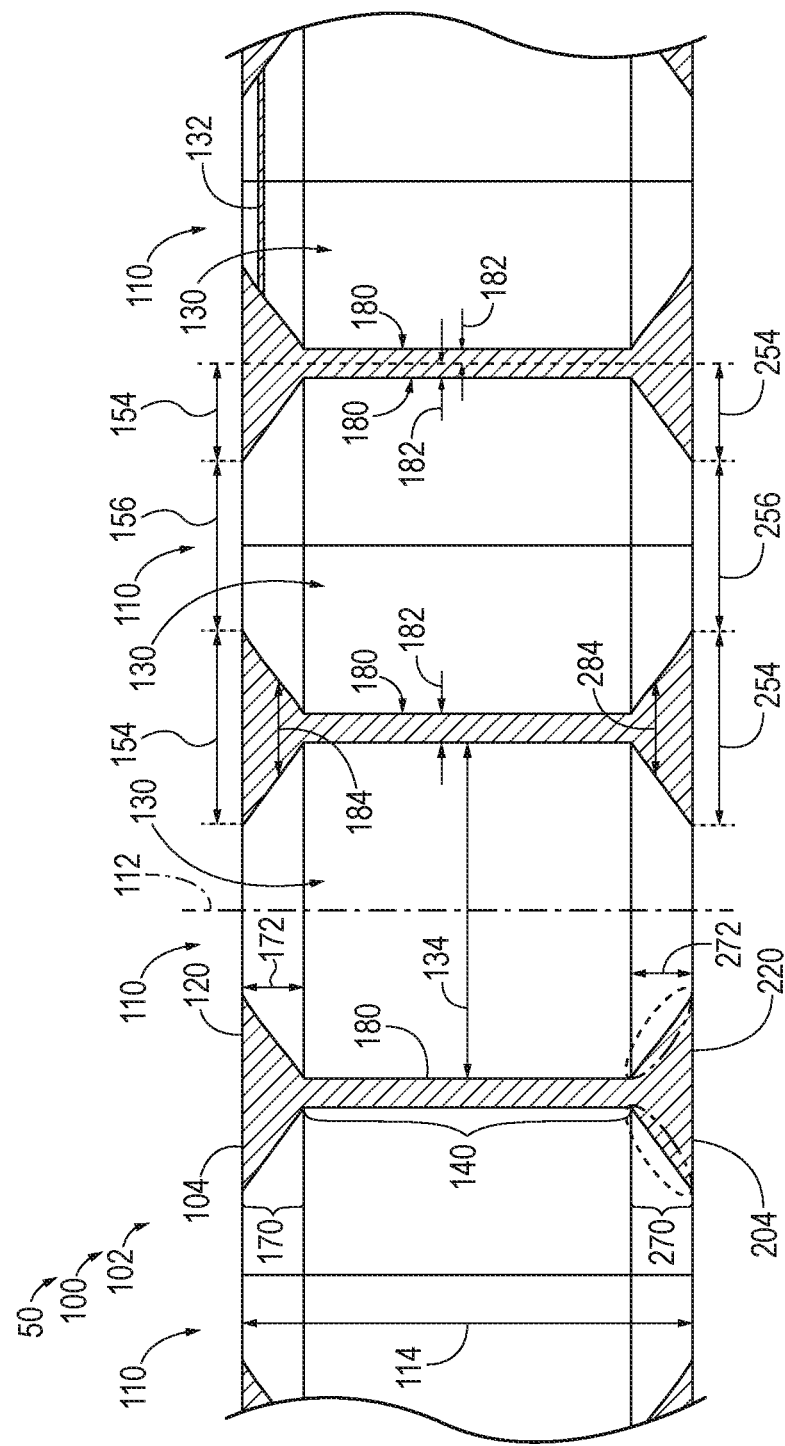
FIG. 5 is a cross-sectional view of a portion of the core structures of FIG. 4 taken along line V-V of FIG. 4.

FIGS. 4-5 illustrate examples of portions of core structures 100 in which each core cell 110 includes six cell walls 180. Specifically, FIG. 4 is a less schematic fragmentary bottom plan view illustrating examples of core structures 100, and FIG. 5 is a cross-sectional fragmentary elevation view of a portion of the core structures 100 taken along line V-V of FIG. 4. As illustrated in FIGS. 4-5, each cell wall 180 may be described as having a bulk cell wall thickness 182, as measured in a direction perpendicular to cell axis 112, within bulk region 140. Each core cell 110 may have and/or share a corresponding cell wall 180 in any appropriate manner. For example, each cell wall 180 may be shared by each of two adjacent core cells 110. In such an embodiment, and as illustrated in the center of FIG. 5, bulk cell wall thickness 182 may be measured from tubular cell void 130 of one core cell 110 to tubular cell void 130 of an adjacent core cell 110. Alternatively, each core cell 110 may include a corresponding unique cell wall 180, such that each cell wall 180 of a first core cell 110 extends adjacent to a corresponding cell wall 180 of a second core cell 110. In such an embodiment, and as illustrated on the right-hand side of FIG. 5, bulk cell wall thickness 182 may correspond to half a distance from tubular cell void 130 of one core cell 110 to tubular cell void 130 of an adjacent core cell 110. In some examples, cell wall 180 may not separate and/or extend between two adjacent core cells 110, such as when the corresponding core cell 110 is located at body edge 103 of core body 102. In such an example, bulk cell wall thickness 182 may correspond to a full thickness of cell wall 180 at body edge 103. Core cell 110 may have any appropriate bulk cell wall thickness 182. As examples, bulk cell wall thickness 182 may be 0.05 millimeters (mm), at least 0.1 mm, at least 0.3 mm, at least 0.5 mm, at least 1 mm, at least 3 mm, at least 5 mm, at most 10 mm, at most 7 mm, at most 2 mm, at most 0.7 mm, at most 0.2 mm, and/or at most 0.07 mm.

As illustrated in FIGS. 4-5, each cell wall 180 additionally or alternatively may be described as having a transition cell wall thickness 184, as measured in a direction perpendicular to cell axis 112, within transition region 170. Specifically, transition cell wall thickness 184 may vary across transition region 170 between bulk cell wall thickness 182 in bulk region 140 and a first end wall thickness 154 at first end 120 of core cell 110, such that first end wall thickness 154 is greater than (i.e., larger than) bulk cell wall thickness 182. In an embodiment in which core cell 110 includes first transition region 170 and second transition region 270, transition cell wall thickness 184 may be a first transition cell wall thickness 184, each cell wall additionally may be described as having a second transition cell wall thickness 284, as measured in a direction perpendicular to cell axis 112, within second transition region 270. In such an embodiment, second transition cell wall thickness 284 may vary across second transition region 270 between bulk cell wall thickness 182 in bulk region 140 and a second end wall thickness 254 at second end 220 of core cell 110, such that second end wall thickness 254 is greater than bulk cell wall thickness 182.

First transition cell wall thickness 184 may vary across first transition region 170, and/or second transition cell wall thickness 284 may vary across second transition region 270, in any appropriate manner. For example, and as illustrated in FIG. 5, first transition cell wall thickness 184 may vary continuously across first transition region 170 between bulk cell wall thickness 182 and first end wall thickness 154, and/or second transition cell wall thickness 284 may vary continuously across second transition region 270 between bulk cell wall thickness 182 and second end wall thickness 254. Additionally or alternatively, first transition region 170 and/or second transition region 270 may have a profile, as viewed along a direction perpendicular to cell axis 112 and parallel to a direction along which cell wall 180 extends, that is triangular, rectangular, rounded, curved, concave, convex, filleted, and/or chamfered. As examples, the lower left-hand portion of FIG. 5 illustrates examples in which second transition region 270 has a profile that is convex (dashed lines) and concave (dash-dot lines).

Each core cell 110 may have any appropriate first end wall thickness 154 and/or second end wall thickness 254. As examples, each of first end wall thickness 154 and/or second end wall thickness 254 may be at least 0.1 mm, at least 0.3 mm, at least 0.5 mm, at least 1 mm, at least 3 mm, at least 5 mm, at least 10 mm, at most 15 mm, at most 7 mm, at most 2 mm, at most 0.7 mm, at most 0.2 mm, and/or at most 0.07 mm. Additionally or alternatively, each of first end wall thickness 154 and/or second end wall thickness 254 may be at least 110% of bulk cell wall thickness 182, at least 125% of bulk cell wall thickness 182, at least 150% of bulk cell wall thickness 182, at least 200% of bulk cell wall thickness 182, at least 250% of bulk cell wall thickness 182, at least 300% of bulk cell wall thickness 182, at least 400% of bulk cell wall thickness 182, at most 500% of bulk cell wall thickness 182, at most 450% of bulk cell wall thickness 182, at most 350% of bulk cell wall thickness 182, at most 275% of bulk cell wall thickness 182, at most 225% of bulk cell wall thickness 182, at most 175% of bulk cell wall thickness 182, at most 133% of bulk cell wall thickness 182, and/or at most 115% of bulk cell wall thickness 182. Second end wall thickness 254 may be at least substantially equal to first end wall thickness 154. However, this is not required to all examples of core cell 110, and it is additionally within the scope of the present disclosure that first end wall thickness 154 and second end wall thickness 254 may be different.

Each core cell 110 may have any appropriate dimensions. For example, and as illustrated in FIG. 5, each core cell 110 may be characterized by a cell height 114, as measured between first end 120 and second end 220 and in a direction parallel to cell axis 112. As more specific examples, cell height 114 may be at least 5 mm, at least 10 mm, at least 20 mm, at least 40 mm, at least 60 mm, at least 80 mm, at least 100 mm, at least 130 mm, at least 150 mm, at least 200 mm, at least 230 mm, at least 250 mm, at most 300 mm, at most 270 mm, at most 220 mm, at most 170 mm, at most 120 mm, at most 110 mm, at most 90 mm, at most 70 mm, at most 50 mm, at most 30 mm, at most 15 mm, and/or at most 7 mm. Additionally or alternatively, and as illustrated in FIG. 5, first transition region 170 may be characterized by a first transition region height 172, as measured between first end 120 and bulk region 140 of core cell 110 and in a direction parallel to cell axis 112. Similarly, second transition region 270, when present, may be characterized by a second transition region height 272, as measured between second end 220 and bulk region 140 of core cell 110 and in a direction parallel to cell axis 112. Second transition region height 272 may be at least substantially equal to first transition region height 172. However, this is not required to all examples of core cell 110, and it is additionally within the scope of the present disclosure that first transition region height 172 and second transition region height 272 may be different.

First transition region height 172 and/or second transition region height 272 may have any appropriate values. As examples, first transition region height 172 and/or second transition region height 272 each may be at least 0.1 mm, at least 0.3 mm, at least 1 mm, at least 3 mm, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and/or at most 0.2 mm. Additionally or alternatively, first transition region height 172 and/or second transition region height 272 each may be at least 1% of cell height 114 of core cell 110, at least 5% of cell height 114, at least 10% of cell height 114, at least 20% of cell height 114, at least 30% of cell height 114, at least 40% of cell height 114, at least 50% of cell height 114, at most 60% of cell height 114, at most 45% of cell height 114, at most 35% of cell height 114, at most 25% of cell height 114, at most 15% of cell height 114, at most 7% of cell height 114, and/or at most 2% of cell height 114.

As illustrated in FIGS. 4-5, each core cell 110 additionally or alternatively may be characterized by a bulk cell diameter 134, as measured in a direction perpendicular to cell axis 112 and equal to a maximum diameter of a circle (illustrated in dash-dot lines in FIG. 4) that may be inscribed within cell wall(s) 180 in bulk region 140. As examples, bulk cell diameter 134 may be at least 1 mm, at least 3 mm, at least 5 mm, at least 10 mm, at least 15 mm, at least 20 mm, at most 25 mm, at most 17 mm, at most 12 mm, at most 7 mm, and/or at most 2 mm.

As further illustrated in FIGS. 4-5, core cell 110 additionally or alternatively may be characterized by a transverse cross-sectional area 132 of tubular cell void 130, as measured in a plane perpendicular to cell axis 112. Transverse cross-sectional area 132 may be measured at any appropriate location within tubular cell void 130. For example, FIGS. 4-5 illustrate transverse cross-sectional area 132 as being measured within first transition region 170 proximate first end 120 of core cell 110. Transverse cross-sectional area 132 may vary continuously across first transition region 170 and/or across second transition region 270.

Transverse cross-sectional area 132 may be characterized in terms of regions of core cell 110. As examples, transverse cross-sectional area 132 may have an average bulk area value within bulk region 140 of core cell 110, a first average end area value within first transition region 170 of core cell 110, a second average end area value within second transition region 270 of core cell 110 (when present), and/or an average transverse cross-sectional area value averaged across a full height of tubular cell void 130. The first average end area value and (when present) the second average end area value each may be smaller than the average bulk area value. The second average end area value may be at least substantially equal to the first average end area value. However, this is not required to all examples of core cell 110, and it is additionally within the scope of the present disclosure that the first average end area value and the second average end area value may be different. Additionally or alternatively, transverse cross-sectional area 132 of tubular cell void 130, as measured at first end 120 and/or at second end 220 of core cell 110, may be smaller than the average transverse cross-sectional area. Transverse cross-sectional area 132 as measured at second end 220 of core cell 110 may be at least substantially equal to transverse cross-sectional area 132 as measured at first end 120 of core cell 110. However, this is not required to all examples of core cell 110, and it is additionally within the scope of the present disclosure that transverse cross-sectional area 132 as measured at first end 120 of core cell 110 may be different than transverse cross-sectional area 132 as measured at second end 220 of core cell 110.

Transverse cross-sectional area 132 may have any appropriate average bulk area value. As examples, the average bulk area value of transverse cross-sectional area 132 may be at least 1 square millimeter ($mm^2$), at least 5 $mm^2$, at least 10 $mm^2$, at least 30 $mm^2$, at least 50 $mm^2$, at least 100 $mm^2$, at least 300 $mm^2$, at least 500 $mm^2$, at most 1000 $mm^2$, at most 700 $mm^2$, at most 200 $mm^2$, at most 70 $mm^2$, at most 20 $mm^2$, at most 7 $mm^2$, and/or at most 2 $mm^2$.

Transverse cross-sectional area 132 may have any appropriate average transverse cross-sectional area value. As examples, the average transverse cross-sectional area value of transverse cross-sectional area 132 may be at least 1 $mm^2$, at least 5 $mm^2$, at least 10 $mm^2$, at least 30 $mm^2$, at least 50 $mm^2$, at least 100 $mm^2$, at least 300 $mm^2$, at least 500 $mm^2$, at most 1000 $mm^2$, at most 700 $mm^2$, at most 200 $mm^2$, at most 70 $mm^2$, at most 20 $mm^2$, at most 7 $mm^2$, and/or at most 2 $mm^2$.

Transverse cross-sectional area 132 may have any appropriate values as measured at first end 120 and/or at second end 220 of core cell 110. As examples, transverse cross-sectional area 132, as measured at first end 120 and/or at second end 220 of core cell 110, may be at least 0.1 $mm^2$, at least 0.5 $mm^2$, at least 1 $mm^2$, at least 5 $mm^2$, at least 10 $mm^2$, at least 30 $mm^2$, at least 50 $mm^2$, at least 100 $mm^2$, at least 300 $mm^2$, at least 500 $mm^2$, at most 1000 $mm^2$, at most 700 $mm^2$, at most 200 $mm^2$, at most 70 $mm^2$, at most 20 $mm^2$, at most 7 $mm^2$, at most 2 $mm^2$, at most 0.7 $mm^2$, and/or at most 0.2 $mm^2$. Additionally or alternatively, transverse cross-sectional area 132, as measured at first end 120 and/or at second end 220 of core cell 110, may be at least 5% of the average transverse cross-sectional area value, at least 10% of the average transverse cross-sectional area value, at least 20% of the average transverse cross-sectional area value, at least 30% of the average transverse cross-sectional area value, at least 40% of the average transverse cross-sectional area value, at least 50% of the average transverse cross-sectional area value, at least 60% of the average transverse cross-sectional area value, at least 70% of the average transverse cross-sectional area value, at least 80% of the average transverse cross-sectional area value, at most 90% of the average transverse cross-sectional area value, at most 85% of the average transverse cross-sectional area value, at most 75% of the average transverse cross-sectional area value, at most 65% of the average transverse cross-sectional area value, at most 55% of the average transverse cross-sectional area value, at most 45% of the average transverse cross-sectional area value, at most 35% of the average transverse cross-sectional area value, at most 25% of the average transverse cross-sectional area value, at most 15% of the average transverse cross-sectional area value, and/or at most 7% of the average transverse cross-sectional area value.

Transverse cross-sectional area 132 may have any appropriate first average end area value and/or second average end area value. As examples, each of the first average end area value and the second average end area value may be at least 0.1 mm², at least 0.5 mm², at least 1 mm², at least 5 mm², at least 10 mm², at least 30 mm², at least 50 mm², at least 100 mm², at least 300 mm², at least 500 mm², at most 1000 mm², at most 700 mm², at most 200 mm², at most 70 mm², at most 20 mm², at most 7 mm², at most 2 mm², at most 0.7 mm², and/or at most 0.2 mm². Additionally or alternatively, each of the first average end area value and the second average end area value may be at least 5% of the average bulk area value, at least 10% of the average bulk area value, at least 20% of the average bulk area value, at least 30% of the average bulk area value, at least 40% of the average bulk area value, at least 50% of the average bulk area value, at least 60% of the average bulk area value, at least 70% of the average bulk area value, at least 80% of the average bulk area value, at most 90% of the average bulk area value, at most 85% of the average bulk area value, at most 75% of the average bulk area value, at most 65% of the average bulk area value, at most 55% of the average bulk area value, at most 45% of the average bulk area value, at most 35% of the average bulk area value, at most 25% of the average bulk area value, at most 15% of the average bulk area value, and at most 7% of the average bulk area value.

Cell wall(s) 180 additionally or alternatively may be characterized with respect to bulk cell diameter 134. As examples, first end wall thickness 154 and/or second end wall thickness 254 each may be at least 5% of bulk cell diameter 134, at least 10% of bulk cell diameter 134, at least 20% of bulk cell diameter 134, at least 30% of bulk cell diameter 134, at least 40% of bulk cell diameter 134, at most 50% of bulk cell diameter 134, at most 45% of bulk cell diameter 134, at most 35% of bulk cell diameter 134, at most 25% of bulk cell diameter 134, at most 15% of bulk cell diameter 134, and/or at most 7% of bulk cell diameter 134.

As further illustrated in FIG. 4, each core cell 110 additionally or alternatively may be characterized by a first end diameter 156, as measured in a direction perpendicular to cell axis 112 and equal to a maximum diameter of a circle (illustrated in dash-dot lines in FIG. 4) that may be inscribed within cell wall(s) 180 at first end 120 of core cell 110. As examples, first end diameter 156 may be at least 1 mm, at least 3 mm, at least 5 mm, at least 10 mm, at least 15 mm, at least 20 mm, at most 25 mm, at most 17 mm, at most 12 mm, at most 7 mm, and/or at most 2 mm.

First end diameter 156 generally is smaller than bulk cell diameter 134. As more specific examples, first end diameter 156 may be at least 1% of bulk cell diameter 134, at least 5% of bulk cell diameter 134, at least 10% of bulk cell diameter 134, at least 30% of bulk cell diameter 134, at least 50% of bulk cell diameter 134, at least 70% of bulk cell diameter 134, at least 90% of bulk cell diameter 134, at most 95% of bulk cell diameter 134, at most 85% of bulk cell diameter 134, at most 75% of bulk cell diameter 134, at most 60% of bulk cell diameter 134, at most 40% of bulk cell diameter 134, at most 35% of bulk cell diameter 134, at most 25% of bulk cell diameter 134, at most 15% of bulk cell diameter 134, at most 7% of bulk cell diameter 134, and/or at most 2% of bulk cell diameter 134. In some examples, first transition region 170 may be configured such that first end diameter 156 is zero. Stated differently, first end 120 of core cell 110 may be an enclosed first end 120, and/or first transition region 170 of each core cell 110 may be configured such that cell wall(s) 180 collectively close core cell 110 at first end 120.

As additionally illustrated in FIGS. 4-5, each core cell 110 additionally or alternatively may be characterized by a second end diameter 256, as measured in a direction perpendicular to cell axis 112 and equal to a maximum diameter of a circle (illustrated in dash-dot lines in FIG. 4) that may be inscribed within cell wall(s) 180 at second end 220 of core cell 110. As examples, second end diameter 256 may be at least 1 mm, at least 3 mm, at least 5 mm, at least 10 mm, at least 15 mm, at least 20 mm, at most 25 mm, at most 17 mm, at most 12 mm, at most 7 mm, and/or at most 2 mm.

Second end diameter 256 may be smaller than bulk cell diameter 134. As more specific examples, second end diameter 256 may be at least 1% of bulk cell diameter 134, at least 5% of bulk cell diameter 134, at least 10% of bulk cell diameter 134, at least 30% of bulk cell diameter 134, at least 50% of bulk cell diameter 134, at least 70% of bulk cell diameter 134, at least 90% of bulk cell diameter 134, at most 95% of bulk cell diameter 134, at most 85% of bulk cell diameter 134, at most 75% of bulk cell diameter 134, at most 60% of bulk cell diameter 134, at most 40% of bulk cell diameter 134, at most 35% of bulk cell diameter 134, at most 25% of bulk cell diameter 134, at most 15% of bulk cell diameter 134, at most 7% of bulk cell diameter 134, and/or at most 2% of bulk cell diameter 134. In some examples, second transition region 270 may be configured such that second end diameter 256 is zero. Stated differently, second end 220 of core cell 110 may be an enclosed second end 220, and/or second transition region 270 of each core cell 110 may be configured such that cell wall(s) 180 collectively close core cell 110 at second end 220. As illustrated in FIG. 4, second end diameter 256 may be at least substantially equal to first end diameter 156. However, this is not required to all examples of core cell 110, and it is additionally within the scope of the present disclosure that first end diameter 156 and second end diameter 256 may be different.

While FIGS. 4-5 illustrate each core cell 110 in core body 102 as having substantially identical dimensions, this is not required to all examples of core structure 100. For example, and as schematically illustrated in FIG. 3, core body 102 may include a first body region 106 that includes at least a first core cell 111 and a second body region 206 that includes at least a second core cell 211, such that first end wall thickness 154 of first core cell 111 is greater than first end wall thickness 154 of second core cell 211. In such an example, second end wall thickness 254 of first core cell 111 may be greater than, smaller than, or equal to second end wall thickness 254 of second core cell 211. Additionally or alternatively, transverse cross-sectional area 132 of first core cell 111 may have a first average end area value that is smaller than the first average end area value of transverse cross-sectional area 132 of second core cell 211. In such an example, the second average end area value of transverse cross-sectional area 132 of first core cell 111 may be greater than, smaller than, or equal to the second average end area value of transverse cross-sectional area 132 of second core cell 211. Additionally or alternatively, transverse cross-sectional area 132 of first core cell 111, as measured at first end 120 of first core cell 111, may be smaller than transverse cross-sectional area 132 of second core cell 211, as measured at first end 120 of second core cell 211. In such an example, transverse cross-sectional area 132 of first core cell 111, as measured at second end 220 of first core cell 111, may be greater than, smaller than, or equal to transverse cross-sectional area 132 of second core cell 211, as measured at second end 220 of second core cell 211.

In an embodiment in which each of first body region 106 and second body region 206 includes a corresponding plurality of core cells 110, first end wall thickness 154 of each core cell 110 of the plurality of core cells 110 positioned in first body region 106 may be greater than first end wall thickness 154 of each core cell 110 positioned in second body region 206. Additionally or alternatively, in such an embodiment, the first average end area value of transverse cross-sectional area 132 of each core cell 110 positioned in first body region 106 may be smaller than the average end area value of transverse cross-sectional area 132 of each core cell 110 positioned in second body region 206. Additionally or alternatively, in such an embodiment, an average of transverse cross-sectional area 132 of each core cell 110 positioned in first body region 106, as measured at first end 120 of each core cell 110 in first body region 106, may be smaller than an average of transverse cross-sectional area 132 of each core cell 110 positioned in second body region 206, as measured at first end 120 of each core cell 110 in second body region 206.

First body region 106 and second body region 206 may have any appropriate spatial relationship, such as with respect to an overall structure of core body 102. As an example, and as schematically illustrated in FIG. 3, first body region 106 may be proximate body edge 103 of core body 102 relative to second body region 206.

Figure 6:
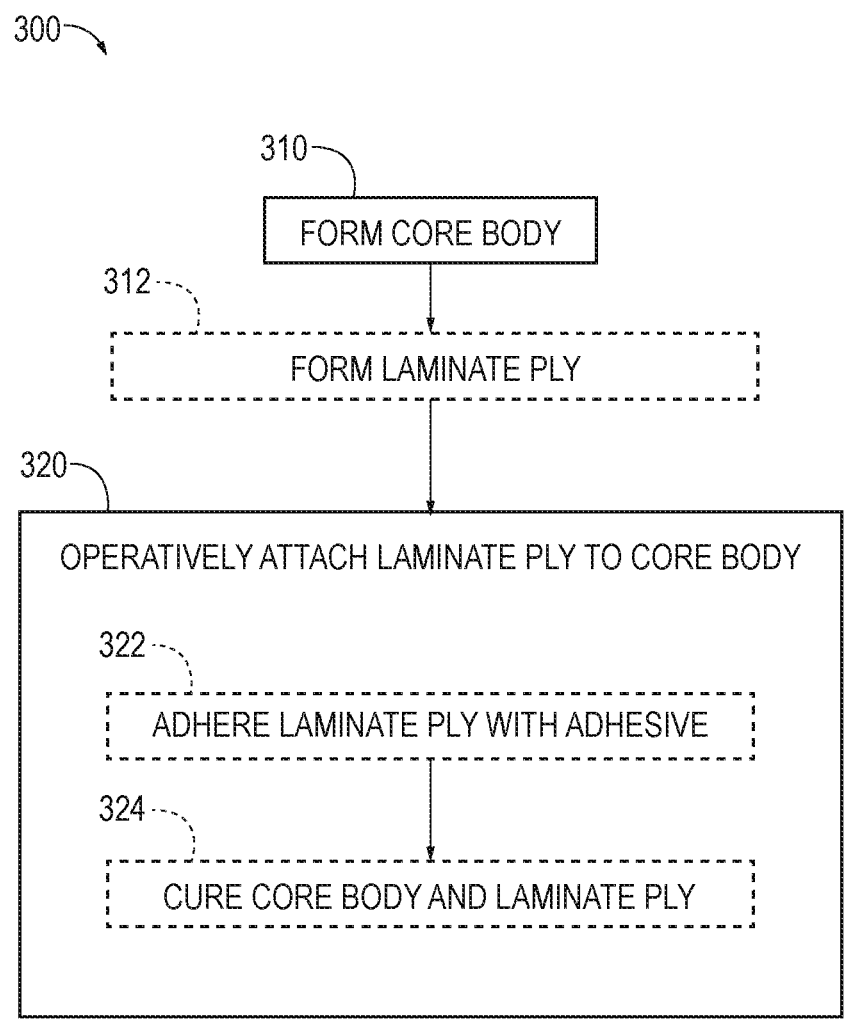
FIG. 6 is a flowchart depicting methods of manufacturing a composite panel according to the present disclosure.

FIG. 6 is a flowchart depicting methods 300, according to the present disclosure, of manufacturing a composite panel. As shown in FIG. 6, a method 300 includes forming, at 310, a core body (such as core body 102), and operatively attaching, at 320, at least one laminate ply (such as laminate ply 52 and/or laminate ply 54) to the core body.

The forming at 310 includes forming via an additive manufacturing process, examples of which include fused deposition modeling, laser sintering, resin infusion, stereolithography, and/or powder bed fusion. As discussed, the forming at 310 may include forming such that a first body side (such as first body side 104) and/or a second body side (such as second body side 204) of the core body has a roughened surface, such as to facilitate bonding between the core body and the at least one laminate ply. As a more specific example, the forming at 310 may include forming via an additive manufacturing process that produces a roughened and/or patterned surface of the core body, thereby producing a larger surface area for bonding between the core body and the laminate ply.

As shown in FIG. 6, methods 300 additionally may include forming, at 312, the at least one laminate ply, such that the forming at 312 also includes forming via an additive manufacturing process. In such an example, the forming at 310 may include forming the core via a core additive manufacturing process, and the forming at 312 may include forming the at least one laminate ply via a laminate additive manufacturing process. As examples, the laminate additive manufacturing process may include fused deposition modeling, laser sintering, resin infusion, stereolithography, and/or powder bed fusion. As additional examples, the core additive manufacturing process and the laminate additive manufacturing process may include and/or be the same process, at least partially the same process, and/or distinct processes. The forming at 310 and/or the forming at 312 may include forming the core body and/or the at least one laminate ply of any appropriate material, such as an epoxy resin, polyester, vinyl ester, a phenolic resin, a thermoplastic resin, and/or a bismaleimide resin.

The operatively attaching at 320 may be performed in any appropriate manner. For example, the at least one laminate ply may include a first laminate ply (such as first laminate ply 52) and a second laminate ply (such as laminate ply 54), and the operatively attaching at 320 may include operatively attaching the first laminate ply to a first body side (such as first body side 104) of the core body and operatively attaching the second laminate ply to a second body side (such as second body side 204) of the core body. As a more specific example, and as shown in FIG. 6, the operatively attaching at 320 may include adhering, at 322, at least one laminate ply to the core body with an adhesive. Additionally or alternatively, and as further shown in FIG. 6, the operatively attaching at 320 may include curing, at 324, the core body and the at least one laminate ply to secure the at least one laminate ply to the core body. The curing at 324 may include curing to solidify the laminate ply and/or the core body, may include curing to set an adhesive that is applied between the laminate ply and the core body, and/or may include curing to bond the laminate ply directly to the core body directly. As an example, the operatively attaching at 320 may include positioning the first laminate ply and/or the second laminate ply adjacent to the core body, and the curing at 324 may include simultaneously curing the core body, the first laminate ply, and/or the second laminate ply such that the components are adhered and/or joined together. Such an example may be referred to as a co-cure process.

In an example of method 300 in which the operatively attaching at 320 includes the adhering at 322 and the curing at 324, the adhering at 322 and the curing at 324 may be performed in any appropriate order. As an example, the adhering at 322 and the curing at 324 may be performed simultaneously. As a more specific example, the operatively attaching at 320 may include positioning the first laminate ply and/or the second laminate ply adjacent to the core body, applying a layer of adhesive between the first laminate ply and the core body and/or between the second laminate ply and the core body, and simultaneously curing all components such that the components are adhered together. Such an example also may be referred to as a co-cure process. Stated differently, a co-cure process may refer to a process in which one or more laminate plies are cured simultaneously with the core body to adhere the one or more laminate plies to the core body, with or without the use of an adhesive positioned between each laminate ply and the core body. As another example, the adhering at 322 and the curing at 324 may be performed at least partially sequentially. As a more specific example, the curing at 324 may include curing the first laminate ply to at least substantially solidify the first laminate ply, and the adhering at 322 may include adhering the first laminate ply to the core body with an adhesive. In such an example, the operatively attaching at 320 further may include operatively attaching the second laminate ply to the core body, such as by co-curing the second laminate ply and the core body and/or by adhering the second laminate ply to the core body with an adhesive. Such examples may be referred to as co-bond processes.

In an example of method 300 in which the operatively attaching at 320 includes operatively attaching the first laminate ply and the second laminate ply to the core body, the first laminate ply and the second laminate ply may be operatively attached to the core body at least partially via distinct processes. As a more specific example, the operatively attaching at 320 may include operatively attaching the first laminate ply to one of the first body side and the second body side with an adhesive and operatively attaching the second laminate ply to the other of the first body side and the second body side without an adhesive.

Illustrative, non-exclusive examples of inventive subject matter according to the present disclosure are described in the following enumerated paragraphs:

A1.1. A core structure for a composite panel, the core structure comprising:

a core body defining a first body side, an opposed second body side, and a plurality of core cells extending between the first body side and the second body side, wherein each core cell:

(i) includes at least one cell wall extending parallel to a cell axis and between a first end of the core cell and a second end of the core cell, wherein the first end is defined on the first body side and the second end is defined on the second body side; and (ii) defines a tubular cell void that extends parallel to the cell axis at least partially between the first end and the second end of the core cell.

A1.2. The core structure of paragraph A1.1, wherein each cell wall is shared by each of two adjacent core cells.

A1.3. The core structure of paragraph A1.1, wherein each cell wall of a first core cell of the plurality of core cells extends adjacent to a corresponding cell wall of a second core cell of the plurality of core cells.

A1.4. The core structure of any of paragraphs A1.1-A1.3, wherein the at least one cell wall includes at least one of one cell wall, more than one cell wall, three cell walls, four cell walls, five cell walls, six cell walls, and more than six cell walls.

A1.5. The core structure of paragraph A1.4, wherein the at least one cell wall includes six cell walls, and wherein the core structure is a honeycomb core structure.

A1.6. The core structure of any of paragraphs A1.1-A1.5, wherein each core cell of the plurality of core cells includes the same number of cell walls.

A1.7. The core structure of any of paragraphs A1.1-A1.5, wherein at least one core cell of the plurality of core cells includes a different number of cell walls than at least one other core cell of the plurality of core cells.

A1.8. The core structure of any of paragraphs A1.1-A1.7, wherein at least one of the first body side and the second body side is at least substantially smooth, optionally at least substantially arcuate, optionally at least substantially planar.

A1.9. The core structure of any of paragraphs A1.1-A1.8, wherein at least one of the first body side and the second body side is at least partially curved, optionally complexly curved.

A1.10. The core structure of any of paragraphs A1.1-A1.9, wherein at least one of the first body side and the second body side has a surface roughness, defined as an arithmetical mean deviation of a profile of the at least one of the first body side and the second body side, and wherein the surface roughness is at least one of at least 1 micrometer ($\mu m$), at least 5 $\mu m$, at least 10 $\mu m$, at least 50 $\mu m$, at least 100 $\mu m$, at least 200 $\mu m$, at least 500 $\mu m$, at least 1 mm, at most 2 mm, at most 700 $\mu m$, at most 300 $\mu m$, at most 70 $\mu m$, at most 30 $\mu m$, at most 7 $\mu m$, and at most 3 $\mu m$.

A1.11. The core structure of any of paragraphs A1.1-A1.10, wherein each core cell has a cell height, as measured between the first end and the second end and in a direction parallel to the cell axis, and wherein the cell height is at least one of at least 5 millimeters (mm), at least 10 mm, at least 20 mm, at least 40 mm, at least 60 mm, at least 80 mm, at least 100 mm, at least 130 mm, at least 150 mm, at least 200 mm, at least 230 mm, at least 250 mm, at most 300 mm, at most 270 mm, at most 220 mm, at most 170 mm, at most 120 mm, at most 110 mm, at most 90 mm, at most 70 mm, at most 50 mm, at most 30 mm, at most 15 mm, and at most 7 mm.

A1.12. The core structure of any of paragraphs A1.1-A1.11, wherein each core cell of the plurality of core cells has a bulk cell diameter, as measured in a direction perpendicular to the cell axis and equal to a maximum diameter of a circle that may be inscribed within the at least one cell wall in the bulk region, and wherein the bulk cell diameter is at least one of at least 1 mm, at least 3 mm, at least 5 mm, at least 10 mm, at least 15 mm, at least 20 mm, at most 25 mm, at most 17 mm, at most 12 mm, at most 7 mm, and at most 2 mm.

A1.13. The core structure of any of paragraphs A1.1-A1.12, wherein each core cell of the plurality of core cells has a first end diameter, as measured in a direction perpendicular to the cell axis and equal to a maximum diameter of a circle that may be inscribed within the at least one cell wall at the first end, and wherein the first end diameter is at least one of at least 1 mm, at least 3 mm, at least 5 mm, at least 10 mm, at least 15 mm, at least 20 mm, at most 25 mm, at most 17 mm, at most 12 mm, at most 7 mm, and at most 2 mm.

A1.14. The core structure of paragraph A1.13, wherein the first end diameter is smaller than a/the bulk cell diameter.

A1.15. The core structure of paragraph A1.14, wherein the first end diameter is at least one of at least 1% of the bulk cell diameter, at least 5% of the bulk cell diameter, at least 10% of the bulk cell diameter, at least 30% of the bulk cell diameter, at least 50% of the bulk cell diameter, at least 70% of the bulk cell diameter, at least 90% of the bulk cell diameter, at most 95% of the bulk cell diameter, at most 85% of the bulk cell diameter, at most 75% of the bulk cell diameter, at most 60% of the bulk cell diameter, at most 40% of the bulk cell diameter, at most 35% of the bulk cell diameter, at most 25% of the bulk cell diameter, at most 15% of the bulk cell diameter, at most 7% of the bulk cell diameter, and at most 2% of the bulk cell diameter.

A1.16. The core structure of any of paragraphs A1.14-A1.15, wherein the first end is an enclosed first end.

A1.17. The core structure of any of paragraphs A1.14-A1.16, wherein the first end diameter is zero.

A1.18. The core structure of any of paragraphs A1.1-A1.17, wherein each core cell of the plurality of core cells has a second end diameter, as measured in a direction perpendicular to the cell axis and equal to a maximum diameter of a circle that may be inscribed within the at least one cell wall at the second end, and wherein the second end diameter is at least one of at least 1 mm, at least 3 mm, at least 5 mm, at least 10 mm, at least 15 mm, at least 20 mm, at most 25 mm, at most 17 mm, at most 12 mm, at most 7 mm, and at most 2 mm.

A1.19. The core structure of paragraph A1.18, wherein the second end diameter is smaller than a/the bulk cell diameter.

A1.20. The core structure of paragraph A1.19, wherein the second end diameter is at least one of at least 1% of the bulk cell diameter, at least 5% of the bulk cell diameter, at least 10% of the bulk cell diameter, at least 30% of the bulk cell diameter, at least 50% of the bulk cell diameter, at least 70% of the bulk cell diameter, at least 90% of the bulk cell diameter, at most 95% of the bulk cell diameter, at most 85% of the bulk cell diameter, at most 75% of the bulk cell diameter, at most 60% of the bulk cell diameter, at most 40% of the bulk cell diameter, at most 35% of the bulk cell diameter, at most 25% of the bulk cell diameter, at most 15% of the bulk cell diameter, at most 7% of the bulk cell diameter, and at most 2% of the bulk cell diameter.

A1.21. The core structure of any of paragraphs A1.19-A1.20, wherein the second end is an enclosed second end.

A1.22. The core structure of any of paragraphs A1.19-A1.21, wherein the second end diameter is zero.

A1.23. The core structure of any of paragraphs A1.18-A1.22, when dependent from paragraph A1.10, wherein the second end diameter is at least substantially equal to the first end diameter.

A2.1. The core structure of any of paragraphs A1.1-A1.23, wherein each core cell includes a bulk region and a transition region; wherein each cell wall has a bulk cell wall thickness, as measured in a direction perpendicular to the cell axis, within the bulk region; wherein each cell wall has a transition cell wall thickness, as measured in the direction perpendicular to the cell axis, within the transition region; wherein the transition region extends between the bulk region and the first end of the core cell; and wherein the transition cell wall thickness varies across the transition region between the bulk cell wall thickness in the bulk region and a first end wall thickness at the first end of the core cell; and wherein the first end wall thickness is greater than the bulk cell wall thickness.

A2.2. The core structure of paragraph A2.1, wherein the transition cell wall thickness varies continuously across the transition region between the bulk cell wall thickness and the first end wall thickness.

A2.3. The core structure of any of paragraphs A2.1-A2.2, wherein the transition region of each corresponding core cell is a first transition region, the transition cell wall thickness being a first transition cell wall thickness, wherein each core cell further comprises a second transition region, in which each cell wall of the corresponding core cell has a second transition cell wall thickness, as measured in the direction perpendicular to the cell axis, that varies between the bulk cell wall thickness and a second end wall thickness of the cell wall at the second end of the core cell, and wherein the second end wall thickness is greater than the bulk cell wall thickness.

A2.4. The core structure of paragraph A2.3, wherein the bulk region separates the first transition region and the second transition region.

A2.5. The core structure of any of paragraphs A2.3-A2.4, wherein the second end wall thickness is at least substantially equal to the first end wall thickness.

A2.6. The core structure of any of paragraphs A2.1-A2.5, wherein the transition region has a first transition region height, as measured between the first end and the bulk region and in a direction parallel to the cell axis, and wherein the first transition region height is at least one of at least 0.1 mm, at least 0.3 mm, at least 1 mm, at least 3 mm, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A2.7. The core structure of any of paragraphs A2.1-A2.6, wherein the transition region has a/the first transition region height that is at least one of at least 1% of a/the cell height of the corresponding core cell, at least 5% of the cell height, at least 10% of the cell height at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A2.8. The core structure of any of paragraphs A2.3-A2.7, wherein the second transition region has a second transition region height, as measured between the first end and the bulk region and in a direction parallel to the cell axis, and wherein the second transition region height is at least one of at least 0.1 mm, at least 0.3 mm, at least 1 mm, at least 3 millimeters, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A2.9. The core structure of any of paragraphs A2.3-A2.8, wherein the transition region has a/the second transition region height that is at least one of at least 1% of a/the cell height of the corresponding core cell, at least 5% of the cell height, at least 10% of the cell height, at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A2.10. The core structure of any of paragraphs A2.8-A2.9, when dependent from any of paragraphs A2.6-A2.7, wherein the first transition region height and the second transition region height are at least substantially equal.

A2.11. The core structure of any of paragraphs A2.1-A2.10, wherein the bulk cell wall thickness is at least one of at least 0.05 mm, at least 0.1 mm, at least 0.3 mm, at least 0.5 mm, at least 1 mm, at least 3 mm, at least 5 mm, at most 10 mm, at most 7 mm, at most 2 mm, at most 0.7 mm, at most 0.2 mm, and at most 0.07 mm.

A2.12. The core structure of any of paragraphs A2.1-A2.11, wherein the first end wall thickness is at least one of at least 0.1 mm, at least 0.3 mm, at least 0.5 mm, at least 1 mm, at least 3 mm, at least 5 mm, at least 10 mm, at most 15 mm, at most 7 mm, at most 2 mm, at most 0.7 mm, at most 0.2 mm, and at most 0.07 mm.

A2.13. The core structure of any of paragraphs A2.1-A2.12, wherein the first end wall thickness is at least one of at least 110% of the bulk cell wall thickness, at least 125% of the bulk cell wall thickness, at least 150% of the bulk cell wall thickness, at least 200% of the bulk cell wall thickness, at least 250% of the bulk cell wall thickness, at least 300% of the bulk cell wall thickness, at least 400% of the bulk cell wall thickness, at most 500% of the bulk cell wall thickness, at most 450% of the bulk cell wall thickness, at most 350% of the bulk cell wall thickness, at most 275% of the bulk cell wall thickness, at most 225% of the bulk cell wall thickness, at most 175% of the bulk cell wall thickness, at most 133% of the bulk cell wall thickness, and at most 115% of the bulk cell wall thickness.

A2.14. The core structure of any of paragraphs A2.1-A2.13, wherein each core cell of the plurality of core cells has a/the bulk cell diameter, as measured in a direction perpendicular to the cell axis and equal to a maximum diameter of a circle that may be inscribed within the at least one cell wall in the bulk region, and wherein the first end wall thickness is at least one of at least 5% of the bulk cell diameter, at least 10% of the bulk cell diameter, at least 20% of the bulk cell diameter, at least 30% of the bulk cell diameter, at least 40% of the bulk cell diameter, at most 50% of the bulk cell diameter, at most 45% of the bulk cell diameter, at most 35% of the bulk cell diameter, at most 25% of the bulk cell diameter, at most 15% of the bulk cell diameter, and at most 7% of the bulk cell diameter.

A2.15. The core structure of any of paragraphs A2.1-A2.14, wherein the corresponding transition region of each core cell of the plurality of core cells is configured such that the at least one cell wall(s) collectively close the core cell at the first end of the core cell.

A2.16. The core structure of any of paragraphs A2.3-A2.15, wherein the second end wall thickness is at least one of at least 0.1 mm, at least 0.3 mm, at least 0.5 mm, at least 1 mm, at least 3 mm, at least 5 mm, at least 10 mm, at most 15 mm, at most 7 mm, at most 2 mm, at most 0.7 mm, at most 0.2 mm, and at most 0.07 mm.

A2.17. The core structure of any of paragraphs A2.3-A2.16, wherein the second end wall thickness is at least one of at least 110% of the bulk cell wall thickness, at least 125% of the bulk cell wall thickness, at least 150% of the bulk cell wall thickness, at least 200% of the bulk cell wall thickness, at least 250% of the bulk cell wall thickness, at least 300% of the bulk cell wall thickness, at least 400% of the bulk cell wall thickness, at most 500% of the bulk cell wall thickness, at most 450% of the bulk cell wall thickness, at most 350% of the bulk cell wall thickness, at most 275% of the bulk cell wall thickness, at most 225% of the bulk cell wall thickness, at most 175% of the bulk cell wall thickness, at most 133% of the bulk cell wall thickness, and at most 115% of the bulk cell wall thickness.

A2.18. The core structure of any of paragraphs A2.3-A2.17, wherein each core cell of the plurality of core cells has a/the bulk cell diameter, as measured in a direction perpendicular to the cell axis and equal to a maximum diameter of a circle that may be inscribed within the at least one cell wall in the bulk region, and wherein the second end wall thickness is at least one of at least 5% of the bulk cell diameter, at least 10% of the bulk cell diameter, at least 20% of the bulk cell diameter, at least 30% of the bulk cell diameter, at least 40% of the bulk cell diameter, at most 50% of the bulk cell diameter, at most 45% of the bulk cell diameter, at most 35% of the bulk cell diameter, at most 25% of the bulk cell diameter, at most 15% of the bulk cell diameter, and at most 7% of the bulk cell diameter.

A2.19. The core structure of any of paragraphs A2.3-A2.18, wherein the corresponding second transition region of each core cell of the plurality of core cells is configured such that the plurality of cell walls collectively close the core cell at the second end of the core cell.

A2.20. The core structure of any of paragraphs A2.1-A2.19, wherein the core body includes a first body region and a second body region, wherein the plurality of core cells includes a first core cell located in the first body region and a second core cell located in the second body region, and wherein the first end wall thickness of the first core cell is greater than the first end wall thickness of the second core cell.

A2.21. The core structure of paragraph A2.20, when dependent from paragraph A2.3, wherein the second end wall thickness of the first core cell is one of greater than, smaller than, and equal to the second end wall thickness of the second core cell.

A2.22. The core structure of any of paragraphs A2.20-A2.21, wherein the first body region is proximate a body edge of the core body relative to the second body region.

A2.23. The core structure of any of paragraphs A2.1-A2.22, wherein the first end wall thickness of each core cell of the plurality of core cells positioned in the first body region is greater than the first end wall thickness of each core cell of the plurality of core cells positioned in the second body region.

A2.24. The core structure of any of paragraphs A2.1-A2.23, wherein at least one of the first transition region and a/the second transition region has a profile, as viewed along a direction perpendicular to the cell axis and parallel to a direction along which the cell wall extends, that is at least one of triangular, rectangular, rounded, curved, concave, convex, filleted, and chamfered.

A3.1. The core structure of any of paragraphs A1.1-A1.23, wherein each core cell includes a bulk region and a transition region; wherein the tubular cell void of each core cell has a transverse cross-sectional area, as measured in a plane perpendicular to the cell axis; wherein the transverse cross-sectional area has:

(i) an average bulk area value within the bulk region of the core cell; and (ii) an average end area value within the transition region of the core cell, wherein the average end area value is smaller than the average bulk area value.

A3.2. The core structure of paragraph A3.1, wherein the transverse cross-sectional area varies continuously across the transition region.

A3.3. The core structure of any of paragraphs A3.1-A3.2, wherein the transition region of each corresponding core cell is a first transition region, wherein the average end area value is a first average end area value, and wherein each core cell further includes a second transition region, in which the transverse cross-sectional area of each core cell has a second average end area value, wherein the second average end area value is smaller than the average bulk area value.

A3.4. The core structure of paragraph A3.3, wherein the second average end area value is at least substantially equal to the first average end area value.

A3.5. The core structure of any of paragraphs A3.1-A3.4, wherein the transition region has a transition region height, as measured between the first end and the bulk region and in a direction parallel to the cell axis, and wherein the transition region height is at least one of at least 0.1 mm, at least 0.3 mm, at least 1 mm, at least 3 millimeters, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A3.6. The core structure of paragraph A3.5, wherein the transition region height is at least one of at least 1% of a/the cell height of the corresponding core cell, at least 5% of the cell height, at least 10% of the cell height at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A3.7. The core structure of any of paragraphs A3.3-A3.6, wherein the second transition region has a second transition region height, as measured between the first end and the bulk region and in a direction parallel to the cell axis, and wherein the second transition region height is at least one of at least 0.1 mm, at least 0.3 mm, at least 1 mm, at least 3 mm, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A3.8. The core structure of paragraph A3.7, wherein the second transition region height is at least one of at least 1% of a/the cell height of the corresponding core cell, at least 5% of the cell height, at least 10% of the cell height, at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A3.9. The core structure of any of paragraphs A3.7-A3.8, when dependent from paragraph A3.5, wherein the first transition region height and the second transition region height are at least substantially equal.

A3.10. The core structure of any of paragraphs A3.1-A3.9, wherein the average bulk area value is at least one of at least 1 square millimeter (mm²), at least 5 mm², at least 10 mm², at least 30 mm², at least 50 mm², at least 100 mm², at least 300 mm², at least 500 mm², at most 1000 mm², at most 700 mm², at most 200 mm², at most 70 mm², at most 20 mm², at most 7 mm², and at most 2 mm².

A3.11. The core structure of any of paragraphs A3.1-A3.10, wherein the first average end area value is at least one of at least 0.1 mm², at least 0.5 mm², at least 1 mm², at least 5 mm², at least 10 mm², at least 30 mm², at least 50 mm², at least 100 mm², at least 300 mm², at least 500 mm², at most 1000 mm², at most 700 mm², at most 200 mm², at most 70 mm², at most 20 mm², at most 7 mm², at most 2 mm², at most 0.7 mm², and at most 0.2 mm².

A3.12. The core structure of any of paragraphs A3.1-A3.11, wherein the first average end area value is at least one of at least 5% of the average bulk area value, at least 10% of the average bulk area value, at least 20% of the average bulk area value, at least 30% of the average bulk area value, at least 40% of the average bulk area value, at least 50% of the average bulk area value, at least 60% of the average bulk area value, at least 70% of the average bulk area value, at least 80% of the average bulk area value, at most 90% of the average bulk area value, at most 85% of the average bulk area value, at most 75% of the average bulk area value, at most 65% of the average bulk area value, at most 55% of the average bulk area value, at most 45% of the average bulk area value, at most 35% of the average bulk area value, at most 25% of the average bulk area value, at most 15% of the average bulk area value, and at most 7% of the average bulk area value.

A3.13. The core structure of any of paragraphs A3.1-A3.12, wherein the corresponding transition region of each core cell of the plurality of core cells is configured such that the at least one cell wall(s) collectively close the core cell at the first end of the core cell.

A3.14. The core structure of any of paragraphs A3.3-A3.13, wherein the second average end area value is at least one of at least 0.1 mm², at least 0.5 mm², at least 1 mm², at least 5 mm², at least 10 mm², at least 30 mm², at least 50 mm², at least 100 mm², at least 300 mm², at least 500 mm², at most 1000 mm², at most 700 mm², at most 200 mm², at most 70 mm², at most 20 mm², at most 7 mm², at most 2 mm², at most 0.7 mm², and at most 0.2 mm².

A3.15. The core structure of any of paragraphs A3.3-A3.14, wherein the second average end area value is at least one of at least 5% of the average bulk area value, at least 10% of the average bulk area value, at least 20% of the average bulk area value, at least 30% of the average bulk area value, at least 40% of the average bulk area value, at least 50% of the average bulk area value, at least 60% of the average bulk area value, at least 70% of the average bulk area value, at least 80% of the average bulk area value, at most 90% of the average bulk area value, at most 85% of the average bulk area value, at most 75% of the average bulk area value, at most 65% of the average bulk area value, at most 55% of the average bulk area value, at most 45% of the average bulk area value, at most 35% of the average bulk area value, at most 25% of the average bulk area value, at most 15% of the average bulk area value, and at most 7% of the average bulk area value.

A3.16. The core structure of any of paragraphs A3.3-A3.15, wherein the corresponding second transition region of each core cell of the plurality of core cells is configured such that the at least one cell wall(s) collectively close the core cell at the second end of the core cell.

A3.17. The core structure of any of paragraphs A3.1-A3.16, wherein the core structure includes a/the first body region and a/the second body region, wherein the plurality of core cells includes at least a/the first core cell located in the first body region and at least a/the second core cell located in the second body region, and wherein the average end area value of the first core cell is smaller than the average end area value of the second core cell.

A3.18. The core structure of paragraph A3.17, when dependent from paragraph A3.3, wherein the second average end area value of the first core cell is one of greater than, smaller than, and equal to the second average end area value of the second core cell.

A3.19. The core structure of any of paragraphs A3.17-A3.18, wherein the average end area value of the transverse cross-sectional area of each core cell of the plurality of core cells positioned in the first body region is smaller than the average end area value of the transverse cross-sectional area of each core cell of the plurality of core cells positioned in the second body region.

A3.20. The core structure of any of paragraphs A3.1-A3.19, wherein at least one of the first transition region and a/the second transition region has a profile, as viewed along a direction perpendicular to the cell axis and parallel to a direction along which the cell wall extends, that is at least one of triangular, rectangular, rounded, curved, concave, convex, filleted, and chamfered.

A4.1. The core structure of any of paragraphs A1.1-A1.23, wherein each core cell includes a transition region that extends from the first side of the core cell; and wherein the at least one cell wall is flared within the transition region such that a/the transverse cross-sectional area of the tubular cell void, as measured at the first end of the core cell, is smaller than an average transverse cross-sectional area averaged across a full height of the tubular cell void.

A4.2. The core structure of paragraph A4.1, wherein the transverse cross-sectional area of the tubular cell void varies continuously across the transition region.

A4.3. The core structure of any of paragraphs A4.1-A4.2, wherein the transition region of each corresponding core cell is a first transition region; wherein each core cell further includes a second transition region that extends from the second side of the core cell; and wherein the at least one cell wall is flared within the second transition region such that the transverse cross-sectional area of the tubular cell void, as measured at the second end of the core cell, is smaller than the average transverse cross-sectional area of the tubular cell void.

A4.4. The core structure of paragraph A4.3, wherein the transverse cross-sectional area of the tubular cell void as measured at the second end of the core cell is at least substantially equal to the transverse cross-sectional area of the tubular cell void as measured at the first end of the core cell.

A4.5. The core structure of any of paragraphs A4.1-A4.4, wherein the transition region has a transition region height, as measured between the first end and the bulk region and in a direction parallel to the cell axis, and wherein the transition region height is at least one of at least 0.1 mm, at least 0.3 mm, at least 1 mm, at least 3 millimeters, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A4.6. The core structure of any of paragraphs A4.1-A4.5, wherein the transition region height is at least one of at least 1% of a/the cell height of the corresponding core cell, at least 5% of the cell height, at least 10% of the cell height at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A4.7. The core structure of any of paragraphs A4.3-A4.6, wherein the second transition region has a second transition region height, as measured between the first end and the bulk region and in a direction parallel to the cell axis, and wherein the second transition region height is at least one of at least 0.1 mm, at least 0.3 mm, at least 1 mm, at least 3 millimeters, at least 5 mm, at least 10 mm, at least 30 mm, at least 50 mm, at least 70 mm, at most 75 mm, at most 60 mm, at most 40 mm, at most 20 mm, at most 15 mm, at most 7 mm, at most 2 mm, at most 0.7 mm, and at most 0.2 mm.

A4.8. The core structure of any of paragraphs A4.3-A4.7, wherein the second transition region has a/the second transition region height that is at least one of at least 1% of a/the cell height of the corresponding core cell, at least 5% of the cell height, at least 10% of the cell height, at least 20% of the cell height, at least 30% of the cell height, at least 40% of the cell height, at least 50% of the cell height, at most 60% of the cell height, at most 45% of the cell height, at most 35% of the cell height, at most 25% of the cell height, at most 15% of the cell height, at most 7% of the cell height, and at most 2% of the cell height.

A4.9. The core structure of any of paragraphs A4.7-A4.8, when dependent from paragraph A4.5, wherein the first transition region height and the second transition region height are at least substantially equal.

A4.10. The core structure of any of paragraphs A4.1-A4.9, wherein the average transverse cross-sectional area value of the tubular cell void is at least one of at least 1 mm$^2$, at least 5 mm$^2$, at least 10 mm$^2$, at least 30 mm$^2$, at least 50 mm$^2$, at least 100 mm$^2$, at least 300 mm$^2$, at least 500 mm$^2$, at most 1000 mm$^2$, at most 700 mm$^2$, at most 200 mm$^2$, at most 70 mm$^2$, at most 20 mm$^2$, at most 7 mm$^2$, and at most 2 mm$^2$.

A4.11. The core structure of any of paragraphs A4.1-A4.10, wherein the transverse cross-sectional area of the tubular cell void, as measured at the first end of the core cell, is at least one of at least 0.1 mm$^2$, at least 0.5 mm$^2$, at least 1 mm$^2$, at least 5 mm$^2$, at least 10 mm$^2$, at least 30 mm$^2$, at least 50 mm$^2$, at least 100 mm$^2$, at least 300 mm$^2$, at least 500 mm$^2$, at most 1000 mm$^2$, at most 700 mm$^2$, at most 200 mm$^2$, at most 70 mm$^2$, at most 20 mm$^2$, at most 7 mm$^2$, at most 2 mm$^2$, at most 0.7 mm$^2$, and at most 0.2 mm$^2$.

A4.12. The core structure of any of paragraphs A4.1-A4.11, wherein the transverse cross-sectional area of the tubular cell void, as measured at the first end of the core cell, is at least one of at least 5% of the average transverse cross-sectional area value of the tubular cell void, at least 10% of the average transverse cross-sectional area value of the tubular cell void, at least 20% of the average transverse cross-sectional area value of the tubular cell void, at least 30% of the average transverse cross-sectional area value of the tubular cell void, at least 40% of the average transverse cross-sectional area value of the tubular cell void, at least 50% of the average transverse cross-sectional area value of the tubular cell void, at least 60% of the average transverse cross-sectional area value of the tubular cell void, at least 70% of the average transverse cross-sectional area value of the tubular cell void, at least 80% of the average transverse cross-sectional area value of the tubular cell void, at most 90% of the average transverse cross-sectional area value of the tubular cell void, at most 85% of the average transverse cross-sectional area value of the tubular cell void, at most 75% of the average transverse cross-sectional area value of the tubular cell void, at most 65% of the average transverse cross-sectional area value of the tubular cell void, at most 55% of the average transverse cross-sectional area value of the tubular cell void, at most 45% of the average transverse cross-sectional area value of the tubular cell void, at most 35% of the average transverse cross-sectional area value of the tubular cell void, at most 25% of the average transverse cross-sectional area value of the tubular cell void, at most 15% of the average transverse cross-sectional area value of the tubular cell void, and at most 7% of the average transverse cross-sectional area value of the tubular cell void.

A4.13. The core structure of any of paragraphs A4.1-A4.12, wherein the corresponding transition region of each core cell of the plurality of core cells is configured such that the at least one cell wall(s) collectively close the core cell at the first end of the core cell.

A4.14. The core structure of any of paragraphs A4.3-A4.13, wherein the transverse cross-sectional area of the tubular cell void, as measured at the second end of the core cell, is at least one of at least 0.1 mm$^2$, at least 0.5 mm$^2$, at least 1 mm$^2$, at least 5 mm$^2$, at least 10 mm$^2$, at least 30 mm$^2$, at least 50 mm$^2$, at least 100 mm$^2$, at least 300 mm$^2$, at least 500 mm$^2$, at most 1000 mm$^2$, at most 700 mm$^2$, at most 200 mm$^2$, at most 70 mm$^2$, at most 20 mm$^2$, at most 7 mm$^2$, at most 2 mm$^2$, at most 0.7 mm$^2$, and at most 0.2 mm$^2$.

A4.15. The core structure of any of paragraphs A4.3-A4.14, wherein the transverse cross-sectional area of the tubular cell void, as measured at the second end of the core cell, is at least one of at least 5% of the average transverse cross-sectional area value of the tubular cell void, at least 10% of the average transverse cross-sectional area value of the tubular cell void, at least 20% of the average transverse cross-sectional area value of the tubular cell void, at least 30% of the average transverse cross-sectional area value of the tubular cell void, at least 40% of the average transverse cross-sectional area value of the tubular cell void, at least 50% of the average transverse cross-sectional area value of the tubular cell void, at least 60% of the average transverse cross-sectional area value of the tubular cell void, at least 70% of the average transverse cross-sectional area value of the tubular cell void, at least 80% of the average transverse cross-sectional area value of the tubular cell void, at most 90% of the average transverse cross-sectional area value of the tubular cell void, at most 85% of the average bulk area value, at most 75% of the average bulk area value, at most 65% of the average transverse cross-sectional area value of the tubular cell void, at most 55% of the average transverse cross-sectional area value of the tubular cell void, at most 45% of the average transverse cross-sectional area value of the tubular cell void, at most 35% of the average transverse cross-sectional area value of the tubular cell void, at most 25% of the average transverse cross-sectional area value of the tubular cell void, at most 15% of the average transverse cross-sectional area value of the tubular cell void, and at most 7% of the average transverse cross-sectional area value of the tubular cell void.

A4.16. The core structure of any of paragraphs A4.3-A4.15, wherein the corresponding second transition region of each core cell of the plurality of core cells is configured such that the at least one cell wall(s) collectively close the core cell at the second end of the core cell.

A4.17. The core structure of any of paragraphs A4.1-A4.16, wherein the core body includes a/the first body region and a/the second body region, wherein the plurality of core cells includes at least a/the first core cell located in the first body region and at least a/the second core cell located in the second body region, and wherein the transverse cross-sectional area of the first core cell, as measured at the first end of the first core cell, is smaller than the transverse cross-sectional area of the second core cell, as measured at the first end of the second core cell.

A4.18. The core structure of any of paragraphs A4.3-A4.17, wherein transverse cross-sectional area of the first core cell, as measured at the second end of the first core cell, is one of greater than, smaller than, and equal to the transverse cross-sectional area of the second core cell, as measured at the second end of the second core cell.

A4.19. The core structure of any of paragraphs A4.1-A4.18, wherein an average transverse cross-sectional area of each core cell of the plurality of core cells positioned in the first body region, as measured at the first end of each core cell of the plurality of core cells positioned in the first body region, is smaller than an average transverse cross-sectional area of each core cell of the plurality of core cells positioned in the second body region, as measured at the first end of each core cell of the plurality of core cells in the second body region.

A4.20. The core structure of any of paragraphs A4.1-A4.19, wherein at least one of the first transition region and a/the second transition region has a profile, as viewed along a direction perpendicular to the cell axis and parallel to a direction along which the cell wall extends, that is at least one of triangular, rectangular, rounded, curved, concave, convex, filleted, and chamfered.

A5.1. The core structure of any of paragraphs A1.1-A1.23, wherein each core cell includes a transition region that includes the first end of the core cell, and wherein the at least one cell wall is flared within the transition region to increase a surface area of the first body side of the core body relative to an average transverse cross-sectional area of the core body.

B1. A composite panel comprising:
the core structure of any of paragraphs A1.1-A5.1; and at least one laminate ply coupled to the first body side of the core body.

B2. The composite panel of paragraph B1, wherein the composite panel further includes at least one laminate ply coupled to the second body side.

B3. The composite panel of any of paragraphs B1-B2, wherein the at least one laminate ply includes one of 1 laminate ply, 2 laminate plies, 3 laminate plies, 4 laminate plies, at least 5 laminate plies, at least 10 laminate plies, at least 20 laminate plies, at least 30 laminate plies, at least 40 laminate plies, at most 50 laminate plies, at most 35 laminate plies, at most 25 laminate plies, at most 15 laminate plies, and at most 7 laminate plies coupled to the first body side.

B4. The composite panel of any of paragraphs B2-B3, wherein the at least one laminate ply includes one of 1 laminate ply, 2 laminate plies, 3 laminate plies, 4 laminate plies, at least 5 laminate plies, at least 10 laminate plies, at least 20 laminate plies, at least 30 laminate plies, at least 40 laminate plies, at most 50 laminate plies, at most 35 laminate plies, at most 25 laminate plies, at most 15 laminate plies, and at most 7 laminate plies coupled to the second body side.

C1. An aircraft including the composite panel of any of paragraphs B1-B4.

C2. The aircraft of paragraph C1, wherein the aircraft includes an airframe that includes the composite panel.

C3. The aircraft of paragraph C2, wherein the airframe includes a skin that is at least partially defined by the composite panel.

C4. The aircraft of any of paragraphs C1-C3, wherein the aircraft includes at least one wing that includes the composite panel.

C5. The aircraft of any of paragraphs C1-C4, wherein the aircraft includes a tail portion that includes the composite panel.

C6. The aircraft of any of paragraphs C1C5, wherein the aircraft includes, and optionally is, at least one of an airplane, a commercial aircraft, a military aircraft, and a spacecraft.

D1. A method of manufacturing a composite panel, the method comprising:
forming, via an additive manufacturing process, the core body of any of paragraphs A1.1-A5.1; and
operatively attaching at least one laminate ply to the core body.

D1.1. A method of manufacturing a composite panel, the method comprising:
forming, via an additive manufacturing process, a core body defining a first body side, an opposed second body side, and a plurality of core cells extending between the first body side and the second body side, wherein each core cell: (i) includes at least one cell wall extending parallel to a cell axis and between a first end of the core cell, which is defined on the first body side, and a second end of the core cell, which is defined on the second body side; and (ii) defines a tubular cell void that extends parallel to the cell axis at least partially between the first end of the core cell and the second end of the core cell; and
operatively attaching at least one laminate ply to the core body.

D2. The method of any of paragraphs D1-D1.1, wherein the additive manufacturing process includes at least one of fused deposition modeling, laser sintering, resin infusion, stereolithography, and powder bed fusion.

D3. The method of any of paragraphs D1-D2, wherein the method additionally includes forming, via an additive manufacturing process, the at least one laminate ply.

D4. The method of paragraph D3, wherein the additive manufacturing process is a core additive manufacturing process, and wherein at least one laminate ply is formed via a laminate additive manufacturing process.

D5. The method of any of paragraphs D1-D4, wherein the laminate additive manufacturing process includes at least one of fused deposition modeling, laser sintering, resin infusion, stereolithography, and powder bed fusion.

D6. The method of any of paragraphs D1-D5, wherein at least one of the core assembly and the at least one laminate ply is formed of at least one of an epoxy resin, polyester, vinyl ester, a phenolic resin, a thermoplastic resin, and a bismaleimide resin.

D7. The method of any of paragraphs D1-D6, wherein the operatively attaching the at least one laminate ply to the core body includes adhering the at least one laminate ply to the core body with an adhesive.

D8. The method of any of paragraphs D1-D7, wherein the operatively attaching the at least one laminate ply to the core body includes curing the core body and the at least one laminate ply to secure the at least one laminate ply to the core body.

D9. The method of any of paragraphs D1-D8, wherein the at least one laminate ply includes a first laminate ply and a second laminate ply, and wherein the operatively attaching the at least one laminate ply to the core structure includes operatively attaching the first laminate ply to the first body side of the core body and operatively attaching the second laminate ply to the second body side of the core body.

D10. The method of paragraph D9, wherein the operatively attaching the at least one laminate ply to the core body includes:

(i) operatively attaching the first laminate ply to one of the first body side of the core body and the second body side of the core body with an adhesive; and (ii) operatively attaching the second laminate ply to the other of the first body side of the core body and second body side of the core body without an adhesive.

D11. The method of any of paragraphs D9-D10, wherein the operatively attaching the at least one laminate ply to the core structure includes positioning the first laminate ply and the second laminate ply adjacent to the core body and simultaneously curing each of the first laminate ply, the second laminate ply, and the core body such that the first laminate ply, the second laminate ply, and the core body are adhered together.

D12. The method of any of paragraphs D9-D11, wherein the operatively attaching the at least one laminate ply to the core structure includes sequentially:

(i) curing the first laminate ply to at least substantially solidify the first laminate ply;

(ii) adhering the first laminate ply to the core body with an adhesive; and (iii) operatively attaching the second laminate ply to the core body;

wherein the operatively attaching the second laminate ply to the core body includes at least one of:

(i) curing the core body and the second laminate ply to secure the second laminate ply to the core body; and (ii) adhering the second laminate ply to the core body with an adhesive.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A core structure for a composite panel, the core structure comprising a core body defining a first body side, a second body side, opposing the first body side, and a plurality of core cells extending between the first body side and the second body side,
wherein:
each of the plurality of core cells:
(i) comprises a cell axis, a first end, defined on the first body side, a second end, defined on the second body side, and at least one cell wall, extending parallel to the cell axis and between the first end and the second end;
(ii) defines a tubular cell void that extends parallel to the cell axis at least partially between the first end and the second end; and
(iii) comprises a bulk region and a transition region, the transition region extending between the bulk region and the first end, and
each of the at least one cell wall has a bulk cell wall thickness, as measured in a direction perpendicular to the cell axis, within the bulk region, and each of the at least one cell wall has a transition cell wall thickness, as measured in the direction perpendicular to the cell axis, within the transition region, the transition cell wall thickness varying across the transition region between the bulk cell wall thickness in the bulk region and a first end wall thickness at the first end, wherein the first end wall thickness is larger than the bulk cell wall thickness.

2. The core structure of claim 1, wherein:
each of the plurality of core cells comprises six cell walls, and
the core structure is a honeycomb core structure.

3. The core structure of claim 1, wherein:
the transition region of each of the plurality of core cells has a transition region height, as measured between the first end of each of the plurality of core cells and the bulk region of each of the plurality of core cells and in a direction parallel to the cell axis;
each of the plurality of core cells has a cell height, as measured between the first end of each of the plurality of core cells and the second end of each of the plurality of core cells and in the direction parallel to the cell axis; and
the transition region height is at most 25% of the cell height.

4. The core structure of claim 1, wherein:
the transition region of each of the plurality of core cells is a first transition region;
the transition cell wall thickness is a first transition cell wall thickness;
each of the plurality of core cells further comprises a second transition region, in which each of the at least one cell wall has a second transition cell wall thickness, as measured in the direction perpendicular to the cell axis, that varies between the bulk cell wall thickness and a second end wall thickness of each of the at least one cell wall at the second end of each of the plurality of core cells; and
the second end wall thickness is greater than the bulk cell wall thickness.

5. The core structure of claim 4, wherein:
the first transition region of each of the plurality of core cells has a first transition region height, as measured between the first end of each of the plurality of core cells and the bulk region of each of the plurality of core cells and in a direction parallel to the cell axis;
the second transition region of each of the plurality of core cells has a second transition region height, as measured between the second end of each of the plurality of core cells and the bulk region of each of the plurality of core cells and in the direction parallel to the cell axis; and
the first transition region height and the second transition region height are at least substantially equal.

6. The core structure of claim 1, wherein:
each of the plurality of core cells has a bulk cell diameter, as measured in the direction perpendicular to the cell axis and equal to a maximum diameter of a circle, capable of being inscribed within the at least one cell wall in the bulk region of each of the plurality of core cells; and
the first end wall thickness is at least 20% of the bulk cell diameter.

7. The core structure of claim 1, wherein:
the core body comprises a first body region and a second body region;
the plurality of core cells comprises a first core cell, located in the first body region, and a second core cell, located in the second body region; and
the first end wall thickness of the first core cell is greater than the first end wall thickness of the second core cell.

8. The core structure of claim 7, wherein the first body region is proximate a body edge of the core body relative to the second body region.

9. The core structure of claim 1, wherein the transition region of each of the plurality of core cells has a profile, as viewed along a direction perpendicular to the cell axis and parallel to a direction along which the cell wall extends, that is at least one of triangular, rectangular, rounded, curved, concave, convex, filleted, and chamfered.

10. A composite panel comprising:
the core structure of claim 1; and
at least one laminate ply coupled to the first body side of the core body.

11. An aircraft, comprising the composite panel of claim 10.

12. The aircraft of claim 11, wherein:
the aircraft comprises an airframe, and
the airframe comprises a skin that is at least partially defined by the composite panel.

13. A method of manufacturing a composite panel, the method comprising steps of:
forming, via an additive manufacturing process, the core body of claim 1; and
operatively attaching at least one laminate ply to the core body.

14. The method of claim 13, wherein the step of operatively attaching the at least one laminate ply to the core body comprises adhering the at least one laminate ply to the core body with an adhesive.

15. The method of claim 13, wherein the step of operatively attaching the at least one laminate ply to the core body comprises curing the core body and the at least one laminate ply to secure the at least one laminate ply to the core body.

16. The method of claim 13, wherein:
the at least one laminate ply comprises a first laminate ply and a second laminate ply, and
the step of operatively attaching the at least one laminate ply to the core body comprises:
(i) operatively attaching the first laminate ply to one of the first body side of the core body and the second body side of the core body with an adhesive; and operatively attaching the second laminate ply to the other of the first body side of the core body and the second body side of the core body without the adhesive.

17. A core structure for a composite panel, the core structure comprising a core body defining a first body side, a second body side, opposing the first body side, and a plurality of core cells, extending between the first body side and the second body side,
wherein:
each of the plurality of core cells:
(i) comprises a cell axis, a first end, defined on the first body side, a second end, defined on the second body side, and at least one cell wall, extending parallel to the cell axis and between the first end and the second end;
defines a tubular cell void that extends parallel to the cell axis at least partially between the first end and the second end; and
comprises a bulk region and a transition region;
the tubular cell void of has a transverse cross-sectional area, as measured in a plane perpendicular to the cell axis;
the transverse cross-sectional area has:
(a) an average bulk area value within the bulk region; and
(b) average end area value within the transition region; and
the average end area value is smaller than the average bulk area value.

18. The core structure of claim 17, wherein the average end area value is at most 85% of the average bulk area value.

19. A core structure for a composite panel, the core structure comprising a core body defining a first body side, a second body side, opposing the first body side, and a plurality of core cells, extending between the first body side and the second body side, wherein each of the plurality of core cells:
(i) comprises a cell axis, a first end, defined on the first body side, a second end, defined on the second body side, and at least one cell wall, extending parallel to the cell axis and between the first end and the second end;
defines a tubular cell void that extends parallel to the cell axis at least partially between the first end and the second end; and
(iii) comprises a transition region that extends from the first end, wherein the at least one cell wall is flared within the transition region such that a transverse cross-sectional area of the tubular cell void, as measured at the first end, is smaller than an average transverse cross-sectional area, averaged across a full height of the tubular cell void.

20. The core structure of claim 19, wherein the transverse cross-sectional area of the tubular cell void of each of the plurality of core cells, as measured at the first end of each of the plurality of core cells, is at most 85% of the average transverse cross-sectional area of the tubular cell void.

* * * * *

UNITED STATES PATENT AND TRADEMARK OFFICE
CERTIFICATE OF CORRECTION

PATENT NO. : 10,960,637 B2
APPLICATION NO. : 16/025243
DATED : March 30, 2021
INVENTOR(S) : William L. Serencsits It is certified that error appears in the above-identified patent and that said Letters Patent is hereby corrected as shown below:

In the Claims

Claim 17, Column 29, Line 15, insert --(ii)-- before "defines a tubular cell void"

Claim 17, Column 29, Line 18, insert --(iii)-- before "comprises a bulk region"

Claim 19, Column 30, Line 13, insert --(ii)-- before "defines a tubular cell void"

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*